(12) United States Patent
Inoue

(10) Patent No.: US 9,723,856 B2
(45) Date of Patent: Aug. 8, 2017

(54) MOLDING CONTAINER

(71) Applicant: AKAGI NYUGYO CO., LTD., Fukaya-shi, Saitama (JP)

(72) Inventor: Sota Inoue, Fukaya (JP)

(73) Assignee: AKAGI NYUGYO CO., LTD., Fukaya-Shi (JP)

( * ) Notice: Subject to any disclaimer, the term of this patent is extended or adjusted under 35 U.S.C. 154(b) by 0 days.

(21) Appl. No.: 14/766,599

(22) PCT Filed: Sep. 25, 2014

(86) PCT No.: PCT/JP2014/075465
§ 371 (c)(1),
(2) Date: Aug. 7, 2015

(87) PCT Pub. No.: WO2015/098216
PCT Pub. Date: Jul. 2, 2015

(65) Prior Publication Data
US 2015/0366236 A1  Dec. 24, 2015

(30) Foreign Application Priority Data
Dec. 27, 2013  (JP) ................. 2013-271257

(51) Int. Cl.
*A23G 9/22* (2006.01)
*B65D 85/78* (2006.01)
(Continued)

(52) U.S. Cl.
CPC ............... *A23G 9/221* (2013.01); *A23G 9/04* (2013.01); *A23G 9/045* (2013.01); *B65B 7/28* (2013.01);
(Continued)

(58) Field of Classification Search
CPC . A23G 9/00; A23G 9/04; A23G 9/221; A23G 9/045; B65D 51/18; B65D 51/28;
(Continued)

(56) References Cited

U.S. PATENT DOCUMENTS 929,389 A * 7/1909 Clement ............... F25D 31/007
249/117
1,275,138 A * 8/1918 Dieterich ................. A23G 9/04
425/441
(Continued)

FOREIGN PATENT DOCUMENTS

AU     23398/95 A     1/1996
CN     2191397 Y      3/1995
(Continued)

OTHER PUBLICATIONS

International Search Report issued in PCT/JP2014/075465, dated Dec. 16, 2014.
(Continued)

*Primary Examiner* — Alison L Hindenlang
*Assistant Examiner* — Emmanuel S Luk
(74) *Attorney, Agent, or Firm* — Birch, Stewart, Kolasch & Birch, LLP

(57) ABSTRACT

A molding container including a lid that can be smoothly pulled out of a molded frozen dessert with no damage to the molded frozen dessert is provided. The molding container 10 includes a main body 12 capable of containing a frozen dessert, and a lid 14 capable of molding at least part of the frozen dessert contained in the main body 12. A spiral step is formed on an outer surface 14c of the lid 14.

5 Claims, 4 Drawing Sheets

(51) Int. Cl.
*B65D 51/18* (2006.01)
*B65D 51/28* (2006.01)
*A23G 9/04* (2006.01)
*B65B 7/28* (2006.01)

(52) U.S. Cl.
CPC ............ *B65D 51/18* (2013.01); *B65D 51/28* (2013.01); *B65D 85/78* (2013.01); *B65D 2251/009* (2013.01); *B65D 2251/0018* (2013.01); *B65D 2251/0028* (2013.01); *B65D 2251/0081* (2013.01)

(58) Field of Classification Search
CPC ............ B65D 85/78; B65D 2251/0018; B65D 2251/0081; B65D 2251/0028; B65D 2251/009; A47J 9/00
USPC ............ 206/514, 515; 222/23.87, 23.89, 781
See application file for complete search history.

(56) References Cited

U.S. PATENT DOCUMENTS

| | | | | |
|---|---|---|---|---|
| 1,280,422 A | * | 10/1918 | Dieterich | A23G 9/04 425/441 |
| 1,467,578 A | * | 9/1923 | Gianini | B65D 43/0229 215/231 |
| 1,607,756 A | * | 11/1926 | Ingram | B65D 45/16 215/277 |
| 1,793,024 A | | 2/1931 | Scofield | |
| 1,854,091 A | | 4/1932 | Young | |
| 1,955,610 A | | 4/1934 | Seipt | |
| 2,058,468 A | * | 10/1936 | Korwan | B65D 51/18 220/258.3 |
| 2,384,041 A | * | 9/1945 | Moore | A23G 9/04 425/410 |
| 2,674,960 A | * | 4/1954 | De Pasquale | A23G 9/04 249/151 |
| 2,746,402 A | * | 5/1956 | Baxter | A23G 9/083 249/146 |
| 2,776,691 A | * | 1/1957 | Tupper | A47J 43/27 220/23.83 |
| RE24,299 E | * | 4/1957 | De Pasquale | A23G 9/04 426/280 |
| 2,945,361 A | * | 7/1960 | Miller | F25C 1/22 220/592.17 |
| 2,961,849 A | * | 11/1960 | Hitchcock | F25C 1/24 215/12.1 |
| 3,070,275 A | * | 12/1962 | Bostrom | B65D 51/28 220/500 |
| 3,288,344 A | * | 11/1966 | Woollen | A47G 19/065 206/217 |
| 3,296,822 A | * | 1/1967 | Gram | A23G 9/083 249/121 |
| 3,337,077 A | | 8/1967 | Wheaton, Jr. | |
| 3,461,192 A | * | 8/1969 | Stasio | E02D 1/04 249/134 |
| 3,514,029 A | * | 5/1970 | Powell | A47G 33/002 206/19 |
| 3,766,975 A | * | 10/1973 | Todd | A47G 19/2288 126/400 |
| 3,807,194 A | * | 4/1974 | Bond | A47G 23/04 62/371 |
| 3,834,437 A | * | 9/1974 | Swett | A23G 9/221 249/139 |
| 4,018,904 A | | 4/1977 | Muraoka | |
| 4,074,827 A | | 2/1978 | Labe, III | |
| 4,089,433 A | * | 5/1978 | Jonsson | B65D 41/08 215/218 |
| 4,285,490 A | | 8/1981 | Hanley | |
| 4,340,138 A | * | 7/1982 | Bernhardt | B65D 51/18 206/216 |
| 4,348,421 A | | 9/1982 | Sakakibara et al. | |
| 4,478,346 A | * | 10/1984 | Spong | A47G 19/2272 220/521 |
| 4,482,047 A | * | 11/1984 | Ackermann | B65D 81/3216 206/216 |
| 4,503,572 A | | 3/1985 | Dawson | |
| 4,582,197 A | | 4/1986 | Lin | |
| 4,638,645 A | * | 1/1987 | Simila | F25D 3/08 62/371 |
| 4,798,313 A | | 1/1989 | Farley | |
| 4,928,848 A | * | 5/1990 | Ballway | A47G 19/2205 215/12.1 |
| 5,040,719 A | * | 8/1991 | Ballway | A47G 19/2205 215/10 |
| D320,558 S | * | 10/1991 | Timm | D7/629 |
| 5,082,136 A | * | 1/1992 | Schumann | B65D 51/228 215/228 |
| 5,099,998 A | * | 3/1992 | Curzon | B65D 77/0493 206/499 |
| 5,180,079 A | * | 1/1993 | Jeng | A47G 19/065 206/217 |
| 5,224,646 A | | 7/1993 | Biancosino | |
| 5,493,866 A | * | 2/1996 | Hotaling | A23G 9/04 426/393 |
| 5,626,897 A | | 5/1997 | Goldstein | |
| 5,971,195 A | * | 10/1999 | Reidinger | B65D 51/28 215/227 |
| 5,971,829 A | | 10/1999 | Hartman | |
| 5,979,695 A | | 11/1999 | Valls et al. | |
| 6,085,927 A | * | 7/2000 | Kusz | B65D 77/0493 215/6 |
| 6,164,471 A | * | 12/2000 | Kassouni | B65D 51/18 215/232 |
| 6,190,226 B1 | | 2/2001 | Conconi | |
| 6,514,555 B1 | | 2/2003 | Fayard et al. | |
| 6,528,105 B1 | | 3/2003 | Gerhart et al. | |
| 6,557,351 B1 | * | 5/2003 | Ghedini | A47G 19/2288 215/393 |
| 7,124,603 B2 | * | 10/2006 | Bianco | A47G 19/2288 62/457.3 |
| 7,341,754 B1 | * | 3/2008 | Loh | B65D 21/0238 206/217 |
| 7,398,893 B2 | * | 7/2008 | Bouie | B65D 1/265 206/515 |
| 7,820,214 B2 | * | 10/2010 | Groenke | A47G 19/02 206/217 |
| 8,402,722 B2 | * | 3/2013 | Buesching | A47G 19/2205 206/217 |
| 8,763,835 B2 | * | 7/2014 | Tirone | A21C 15/005 220/23.86 |
| 8,794,485 B2 | * | 8/2014 | Lunn | B67D 3/0012 222/146.6 |
| D723,871 S | * | 3/2015 | Khubani | D7/505 |
| 8,978,918 B2 | * | 3/2015 | Tirone | F25D 3/08 206/229 |
| 9,078,535 B1 | * | 7/2015 | Buck | A47G 19/2205 |
| 9,204,752 B2 | * | 12/2015 | Dakis | A47J 31/404 |
| D763,621 S | * | 8/2016 | Szymanski | D7/392.1 |
| 2006/0054622 A1 | | 3/2006 | Agnello | A47G 19/12 220/23.87 |
| 2008/0187633 A1 | | 8/2008 | Cox | |
| 2008/0203051 A1 | * | 8/2008 | Dusel | B65D 51/1672 215/350 |
| 2010/0133285 A1 | * | 6/2010 | Schepen | B65D 21/0233 220/781 |
| 2011/0262600 A1 | | 10/2011 | McGill | |
| 2012/0104042 A1 | | 5/2012 | Tirone et al. | |
| 2012/0108407 A1 | * | 5/2012 | Trani | B31B 43/00 493/52 |
| 2013/0008897 A1 | * | 1/2013 | Rusnak | B65D 43/0231 220/23.89 |
| 2013/0068774 A1 | | 3/2013 | Buck | |
| 2013/0156918 A1 | * | 6/2013 | Reinhardt | A23G 9/221 426/515 |
| 2014/0065267 A1 | * | 3/2014 | Albano | A23G 9/221 426/90 |
| 2015/0173557 A1 | * | 6/2015 | Jang | A47J 31/0636 426/82 |
| 2015/0291312 A1 | * | 10/2015 | Kalagher | B65D 81/3227 215/6 |

(56) References Cited

U.S. PATENT DOCUMENTS

| | | | | |
|---|---|---|---|---|
| 2016/0088960 A1* | 3/2016 | Liang | ............... | A47G 19/2272 220/560.01 |
| 2017/0057712 A1* | 3/2017 | Benedetti | ............ | B65D 41/325 |
| 2017/0073143 A1* | 3/2017 | Sheldon | ............ | B65D 81/3205 |

FOREIGN PATENT DOCUMENTS

| | | |
|---|---|---|
| CN | 202820710 U | 3/2013 |
| CN | 105752508 A | 7/2016 |
| EP | 0942882 B1 | 2/2004 |
| GB | 2450909 A | 1/2009 |
| JP | 61-26074 U | 2/1986 |
| JP | 61-150490 U | 9/1986 |
| JP | 62-52185 U | 4/1987 |
| JP | 2-56190 U | 4/1990 |
| JP | 2-80519 U | 6/1990 |
| JP | 7-30084 U | 6/1995 |
| JP | 9-121778 A | 5/1997 |
| JP | 10-117692 A | 5/1998 |
| JP | 3051376 U | 8/1998 |
| JP | 2590743 Y2 | 2/1999 |
| JP | 2000-201625 A | 7/2000 |
| JP | 2000-247333 A | 9/2000 |
| JP | 2001-48281 A | 2/2001 |
| JP | 2002-27917 A | 1/2002 |
| JP | 2005-119729 A | 5/2005 |
| JP | 2007-76709 A | 3/2007 |
| JP | 2008-200049 A | 9/2008 |
| JP | 3154863 U | 10/2009 |
| JP | 2010-17163 A | 1/2010 |
| JP | 2010-22330 A | 2/2010 |
| JP | 2012-510267 A | 5/2012 |
| JP | 2013-153732 A | 8/2013 |
| TW | 425269 B | 3/2001 |
| WO | WO 89/05764 A1 | 6/1989 |
| WO | WO 90/08710 A1 | 8/1990 |
| WO | WO 99/18011 A2 | 4/1999 |
| WO | WO 2007/087967 A1 | 8/2007 |

OTHER PUBLICATIONS

Office Action issued in Japanese Patent Application No. 2013-271257, dated Apr. 22, 2014.
Office Action issued in Japanese Patent Application No. 2013-271257, dated Feb. 12, 2014.
Chinese Office Action and Chinese Search Report, issued Feb. 2, 2016, for Chinese Application No. 201480005389.7.
Chinese Office Action and Search Report, dated Jun. 27, 2016, for Chinese Application No. 201480005389.7.
International Preliminary Report on Patentability (Forms PCT/IB/338, PCT/IPEA/409 and PCT/IPEA/416), dated Jun. 30, 2016, for International Application No. PCT/JP2014/078661, with an English translation of Form PCT/IPEA/409.
International Search Report and Written Opinion of the International Searching Authority (Forms PCT/ISA/210, PCT/ISA/220 and PCT/ISA/237), dated Jan. 20, 2015, for International Application No. PCT/JP2014/078661.
Japanese Office Action, dated Feb. 23, 2016, for Japanese Application No. 2015-548528.
Japanese Office Action, dated Jun. 7, 2016, for Japanese Application No. 2016-086489.
Korean Office Action, dated Dec. 2, 2015, for Korean Application No. 10-2015-7021457.
Taiwanese Office Action and Search Report, dated May 23, 2016, for Taiwanese Application No. 103139914.
Examination Report issued in the corresponding United Kingdom Patent Application No. GB1601247.8 dated Aug. 16, 2016.
Office Action issued in the corresponding Chinese Patent Application No. 201480048551.3 dated Sep. 8, 2016.
Office Action issued in the corresponding Korean Patent Application No. 10-2016-7002373 dated Oct. 10, 2016.
Office Action of U.S. Appl. No. 14/904,656 dated Nov. 10, 2016.
Reconsideration Report dated Nov. 15, 2016, for Japanese Application No. 2016-86489.

* cited by examiner

MOLDING CONTAINER

TECHNICAL FIELD

The present invention relates to a molding container for molding a frozen dessert such as ice cream or sherbet into a prescribed shape.

BACKGROUND ART

Molding containers that can form, in a frozen dessert such as ice cream, a hollow (a recessed portion) into which drink such as coffee, juice, or alcohol is to be poured have been widely known. With such a molding container, by pouring a drink such as coffee, juice, or alcohol into the hollow formed in the frozen dessert and then mixing the frozen dessert and the drink, a frozen drink can be easily prepared.

For example, Patent Literature 1 discloses an example of such a molding container, i.e., a frozen dessert container including a container lid having a conical protrusion. This container lid can form a conical recess in the central portion of a frozen dessert. Patent Literature 2 discloses a container including a cap with its central portion protruding downward. This cap can form a space to be filled with an additional food material at the center of an iced mixture.

CITATION LIST

Patent Literature

Patent Literature 1: Japanese Patent Application Laid-Open No. Hei. 10-117692
Patent Literature 2: Japanese Utility Model Registration No. 2590743

SUMMARY OF INVENTION

Technical Problem

However, with the conventional molding containers, when a hollow is formed in a frozen dessert, the container lid or the cap sticks firmly to the frozen dessert and therefore cannot be pulled out of the frozen dessert smoothly in some cases. Therefore, a problem with such a molding container is that, when, for example, a frozen drink prepared using the molding container is provided to a customer, the preparation time becomes long and therefore the drink cannot be provided quickly.

Another problem is that, when the mold is pulled out, part of the frozen dessert is pulled out together with the mold, so that a liquid poured into the frozen dessert cannot be cooled sufficiently. Still another problem is that, since the mold is forcibly pulled out, the mold is deformed in shape, so that it is difficult to reuse the mold.

The present invention has been made to solve the above conventional problem, and it is an object to provide a molding container including a lid that can be smoothly pulled out of a molded frozen dessert with no damage to the molded frozen dessert.

Solution to Problem

The present invention is a molding container including a main body capable of containing a frozen dessert, and a lid capable of molding at least part of the frozen dessert contained in the main body. The molding container is characterized in that a spiral step is formed on an outer surface of the lid.

Advantageous Effects of Invention

The molding container according to the present invention can provide an excellent effect in that the lid can be pulled out of the molded frozen dessert smoothly with no damage to the molded frozen dessert.

BRIEF DESCRIPTION OF DRAWINGS

FIG. 4(*b*) is a photograph taken after the frozen dessert 18 is molded in the molding container 10.

DESCRIPTION OF EMBODIMENT

A molding container according to an embodiment of the present invention will next be described in detail with reference to the drawings.

<Overall Configuration>

Figure 1:
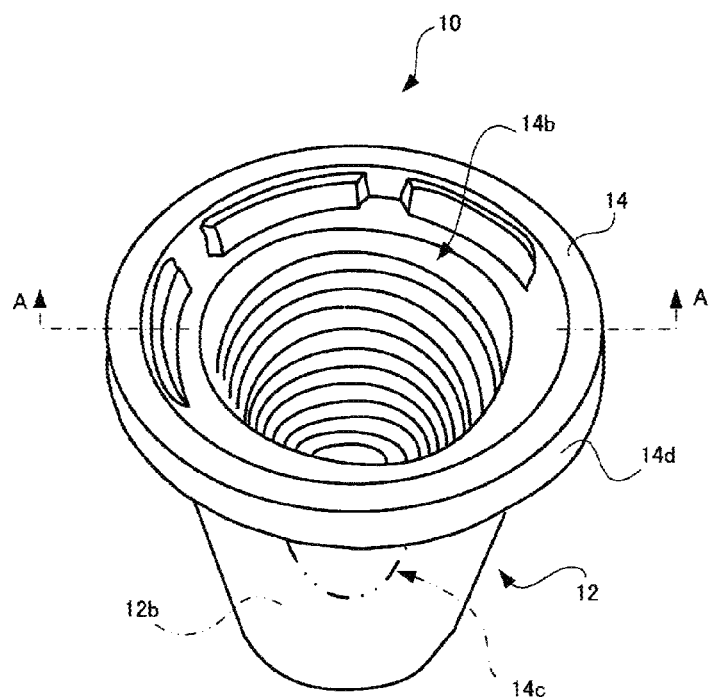
FIG. 1 is an external perspective view of a molding container 10 as viewed from above.
Figure 2:
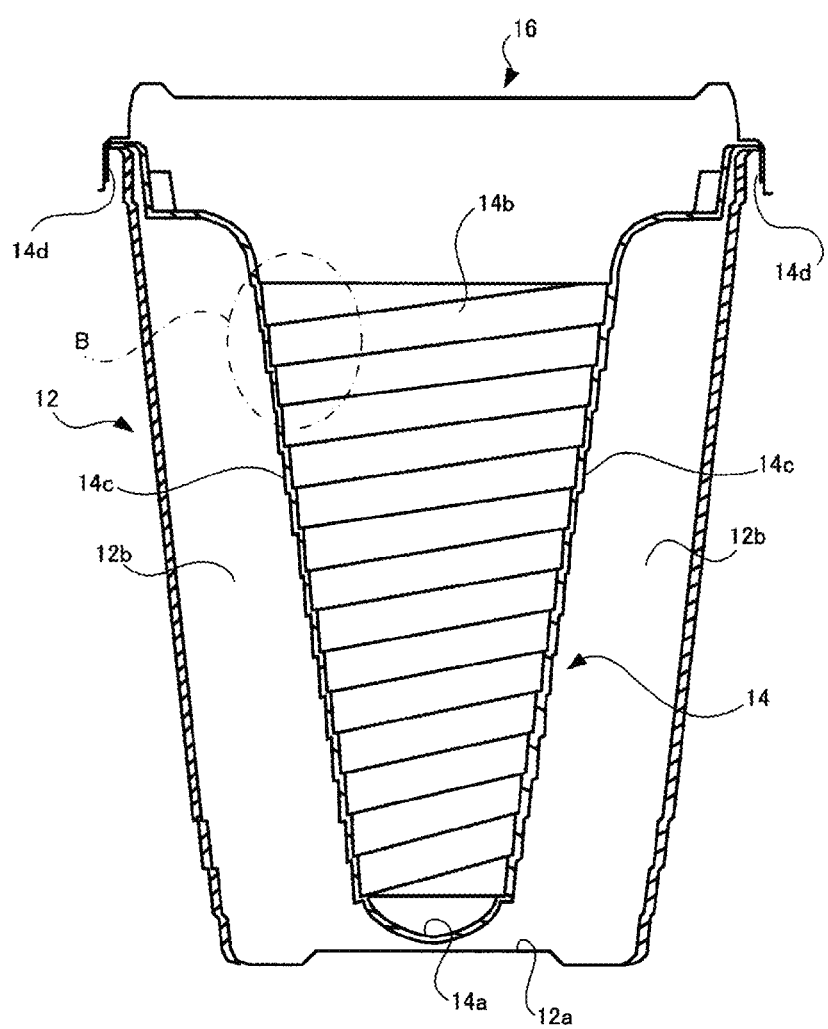
FIG. 2 is a side cross-sectional view taken along line A-A in FIG. 1.

FIG. 1 an external perspective view of a molding container 10 according to the embodiment of the present invention as viewed from above, and FIG. 2 is a side cross-sectional view taken along line A-A in FIG. 1. In FIG. 1, the illustration of an outer lid 16 is omitted, for the convenience of description.

This molding container 10 is configured to include a cylindrical main body 12 capable of containing a frozen dessert such as ice cream or sherbet; an inner lid 14 that has an inverted conical shape, is partially contained in the inner space of the main body 12, and fitted to the upper portion of the main body 12; and the outer lid 16 fitted to the upper portions of the main body 12 and the inner lid 14. The molding container 10 in this example includes the outer lid 16. However, the molding container according to the present invention may not include the outer lid 16 or may include, instead of the outer lid 16, a seal that can close the main body 12 and the inner lid 14 from above.

<Main Body>

The main body 12 will next be described. The main body 12 is a thin-walled semi-transparent member having a cylindrical shape. One end (the upper end) of the main body 12 is open, and a bottom portion 12*a* is formed at the other end the lower end). An inner space 12*b* of the main body 12 can contain a frozen dessert 18 such as ice cream or sherbet (see FIG. 4(*b*)). In this example, since the main body 12 is a semi-transparent member, the state of the frozen dessert contained in the main body 12 can be easily checked visually.

No particular limitation is imposed on the size, shape, and material of the main body 12, so long as the main body 12 has a size and a shape that allow the main body 12 to contain the frozen dessert. Therefore, the shape of the main body 12 may be, for example, a polygonal tabular shape or a conical shape. Any of plastics, metals, paper, and edible containers (such as wafers and cones) can be used as the material of the main body 12 according to its application. Examples of the frozen dessert contained in the main body 12 include, in addition to ice cream and sherbet, jelly, pudding, and shaved ice. Preferably, a material that resists cracking even at refrigeration temperature is used for the main body 12.

<Inner Lid>

The inner lid 14 will next be described. The inner lid 14 is a white thin-walled lid having an inverted conical shape that is a tapered shape having an outer diameter gradually decreasing from one end (the upper end) toward the other end (the lower end). The one end (the upper end) of the inner lid 14 is open, and a bottom portion 14a is formed at the other end. (the lower end). An inverted conical-shaped inner space 14b of the inner lid 14 can contain a sweet material such as the flesh of a fruit, a fruit, or a baked sweet.

No particular limitation is imposed on the size, shape, and material of the inner lid 14, so long as the inner lid 14 can mold the frozen dessert contained in the main body 12. Therefore, the shape of the inner lid 14 may be, for example, a cylindrical shape. Any of plastics, metals, paper, and edible containers (such as wafers and cones) can be used as the material of the inner lid 14 according to its application.

Figure 3:
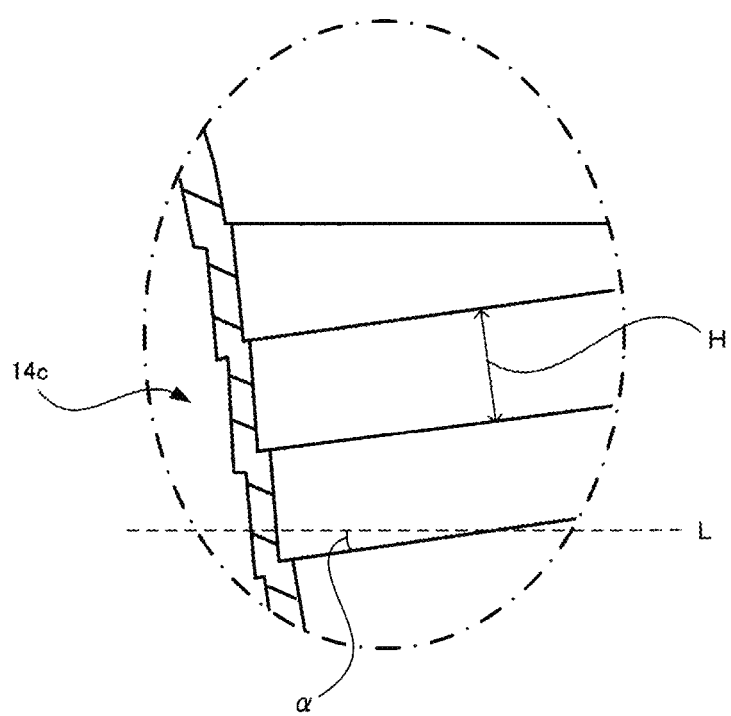
FIG. 3 is a partial enlarged view illustrating a region indicated by symbol 8 in FIG. 2 in an enlarged scale.

FIG. 3 is a partial enlarged view illustrating a region indicated by symbol B in FIG. 2 in an enlarged scale. A spiral step is formed on an outer surface 14c of the inner lid 14 so as to extend from the one end (the upper end) toward the other end (the lower end).

In this example, the width H of the step is substantially constant (about 2 mm in this example) over a region from the one and (the upper end) to the other end. (the lower end), and the inclination angle α of the step with respect to the horizontal line L is also substantially constant (about 20 degrees in this example) over the region from the one end (the upper end) to the other end (the lower end).

The width and inclination angle of the step are not limited to those in this example. For example, the width H of the step may decrease gradually from the one end (the upper end) toward the other end (the lower end). The inclination angle α of the step may be set to an angle other than 20 degrees.

A holding portion 14d protruding outward is formed over the entire upper end portion of the inner lid 14. The holding portion 14d is a portion on which the user places one's fingers when the inner lid 14 is fitted to the main body 12 and when the inner lid 14 is rotated to remove it from the frozen dessert. No particular limitation is imposed on the shape of the holding portion 14d. For example, one or a plurality of recesses or protrusions may be formed in the holding portion 14d so that the user can easily place one's fingers thereon.

<Usage Method of Molding Container>

Figures 4A, 4B:
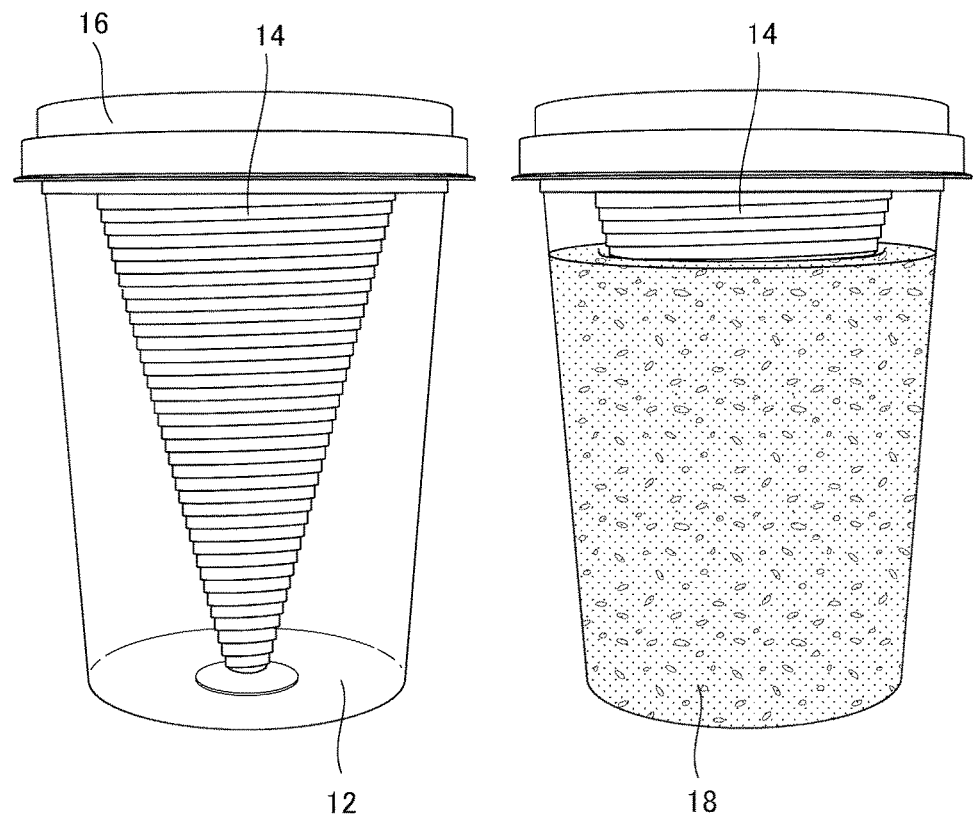
FIG. 4(*a*) is a photograph taken before a frozen dessert 18 is contained in the molding container 10.

The usage method of the molding container 10 will next be described with reference to FIGS. 4(*a*) and 4(*b*). FIG. 4(*a*) is a photograph taken before the frozen dessert 18 is contained in the molding container 10, and FIG. 4(*b*) is a photograph taken after the frozen dessert 18 is molded in the molding container 10.

When the frozen dessert 18 such as ice cream or sherbet is molded, the outer lid 16 and the inner lid 14 are first detached from the main body 12, and the frozen dessert 18 in an unfrozen state is contained in the inner space of the main body 12. Next, the inner lid 14 is fitted to the main body 12 to cause the frozen dessert 18 to adhere sufficiently to the outer surface 14c of the inner lid 14, and then the main body 12 with the inner lid 14 fitted thereto is placed in, for example, a freezer to freeze the frozen dessert 18.

After the frozen dessert 18 freezes, fingers are placed on the holding portion 14d of the inner lid 14, and the inner lid 14 is pulled upward out of the frozen dessert 18 while rotated along the spiral step formed on the surface of the frozen dessert 18. A hollow (a drink-filling space) having a shape complementary to the outer surface of the inner lid 14 is thereby molded in the frozen dessert 18.

A drink such as coffee, juice, or alcohol is poured into the thus-molded hollow of the frozen dessert 18. Then the drink is cooled by the frozen dessert 18, changes into ice form, and is mixed with part of the frozen dessert 18, whereby a frozen drink is prepared.

As described above, the molding container according to this embodiment (for example, the molding container 10) is a molding container including a main body (for example, the main body 12) capable of containing the frozen dessert and a lid (for example, the inner lid 14) capable of molding at least part of the frozen dessert contained in the main body. The molding container is characterized in that a spiral step is formed on the outer surface of the lid.

In the molding container 10 according to this embodiment, since the step is formed on the outer surface of the lid (the inner lid 14), a step having a shape complementary to the step of the lid can be formed on the molded frozen dessert. Therefore, when a drink such as coffee, juice, or alcohol is poured into the molded frozen dessert, the area of contact with the drink can be made larger than, that when no step is formed, so that the drink can be rapidly changed into a frozen drink.

In addition, the lid can be prevented from firmly adhering to the frozen dessert when the frozen dessert is molded, so that the lid can be more smoothly pulled out of the frozen dessert as compared to the case in which no step is formed. For example, when the molding container is used to provide a frozen drink to a customer, the frozen drink can be quickly provided.

Since the step formed on the outer surface of the lid has a spiral form, the lid can be smoothly pulled out of the frozen dessert by rotating the lid along the spiral step formed on the surface of the frozen dessert. This can solve the conventional problems in that the frozen dessert is partially damaged when the lid is pulled out and therefore the liquid poured into the frozen dessert cannot be cooled sufficiently and that the lid is deformed in shape when the lid is pulled out and therefore it is difficult to reuse the lid.

A holding portion (for example, the holding portion 14d) for rotating the lid may be provided at one end of the lid.

With this configuration, the lid can be easily rotated, so that the lid can be more smoothly pulled out of the frozen dessert.

The lid has an inverted conical shape with an opening, and the holding portion may be disposed in the opening.

With this configuration, the area of contact with the frozen dessert can be gradually reduced in a direction away from the holding portion. Therefore, the rotating force required to rotate the lid can be gradually reduced in the direction away from the holding portion, so that the lid can be pulled out of the frozen dessert more smoothly.

An inner space that can contain a sweet material may be formed in the lid.

With this configuration, the sweet material to be added to the frozen drink can be contained separately from the frozen dessert, so that the application of the molding container can be widened.

The configuration of the molding container according to the present invention is not limited to the configuration of the molding container 10 described in the above embodiment. For example, the shape of the inner lid 14 is not limited to the inverted conical shape and may be a cylindrical shape. In the illustrated example, the inner space is formed in the inner lid 14. However, the inner space may not be formed. Moreover, the holding portion 14d may not be provided to the inner lid 14.

<Example>

A molding container having the same shape as that of the molding container 10 (Example) and a conventional molding container including an inner lid with no step on its outer surface (having a flat outer surface) (Comparative Example) were used to mold sherbet, and comparisons were made on the ease of pulling out the inner lid and the shape of the molded frozen dessert.

The result of the experiment showed that, in the molding container according to the Comparative Example, the inner lid adhered to the frozen dessert and could not be pulled out smoothly. However, in the molding container according to the Example, by rotating the inner lid along the spiral step formed on the surface of the frozen dessert, the inner lid could be pulled out smoothly.

In the molding container according to the Comparative Example, the molded frozen dessert was sometimes damaged when the inner lid was pulled out. However, in the molding container according to the Example, the inner lid could be pulled out smoothly with no damage to the molded frozen dessert.

INDUSTRIAL APPLICABILITY

The molding container according to the present invention can be used to provide a frozen drink in a coffee shop or a restaurant.

REFERENCE SIGNS LIST

10 molding container
12 main body
12a bottom portion
14 inner lid
14a bottom portion
14b inner space
14c outer surface
14d holding portion
16 outer lid
18 frozen dessert

The invention claimed is:

1. A molding container comprising:
a main body capable of containing a frozen dessert; and
a removable lid capable of molding at least part of the frozen dessert contained in the main body, wherein
the removable lid has an inverted conical shape and steps are formed in a spiral shape along an outer facing surface of the inverted conical shape, and
the removable lid is disposed on the main body so that the inverted conical shape of the lid extends toward an inside of the main body and the steps face to an inner wall of the main body.

2. The molding container according to claim 1, wherein a holding portion for rotating the removable lid is provided at one end of the removable lid.

3. The molding container according to claim 2, wherein the removable lid has an opening, and
the holding portion is disposed in the opening.

4. The molding container according to claim 3, wherein an inner space of the opening that can contain a sweet material is formed in the lid.

5. The molding container according to claim 3, further comprising an outer lid to cover the opening of the removable lid.

* * * * *